United States Patent Office 3,053,862
Patented Sept. 11, 1962

3,053,862
3-UNSUBSTITUTED STEROIDS OF THE PREGNANE SERIES
Albert Bowers and James C. Orr, Mexico City, Mexico, assignors, by mesne assignments, to Syntex Corporation, a corporation of Panama
No Drawing. Filed Aug. 22, 1961, Ser. No. 133,069
30 Claims. (Cl. 260—397.4)

The present invention relates to cyclopentanophenanthrene compounds and to a process for the production thereof.

More particularly the present invention relates to novel 2-formyl and 2-hydroxymethyl derivatives of 17α-hydroxy-allopregnane, 17α-hydroxy-Δ²-allopregnene and 17α-hydroxy-Δ²,⁴-pregnadiene and to 2-methyl-17α-hydroxy-Δ²-allopregnene and esters thereof.

The novel compounds of the present invention are represented by the following formulas:

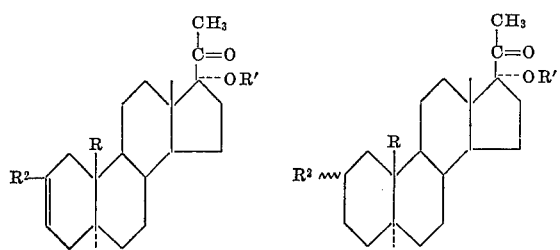

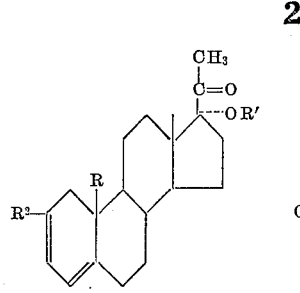 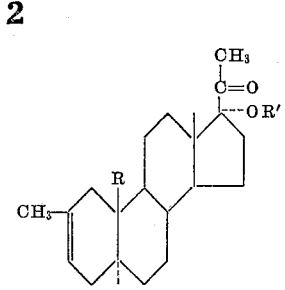

In the above formulas R represents hydrogen or methyl; $R^1$ represents hydrogen or a hydrocarbon carboxylic acyl group containing less than 12 carbon atoms and $R^2$ represents formyl (—CHO) or —$CH_2$—$OR^3$ wherein $R^3$ represents hydrogen or a hydrocarbon carboxylic acyl group of less than 12 carbon atoms. In the saturated compounds $R^2$ may be in the 2α or 2β position.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds represented by the above formulas are potent progestational agents. They also exhibit anti-estrogenic, antigonadotrophic and anti-androgenic activities. They are useful in the treatment of premenstrual tension and lower chloesterol level in blood serum and adrenal gland. In addition they are diuretic and anti-aldosterone agents.

The novel compounds of the present invention which contain the formyl or hydroxymethyl group at C-2 and unsaturation in ring A are prepared by a process illustrated by the following equation:

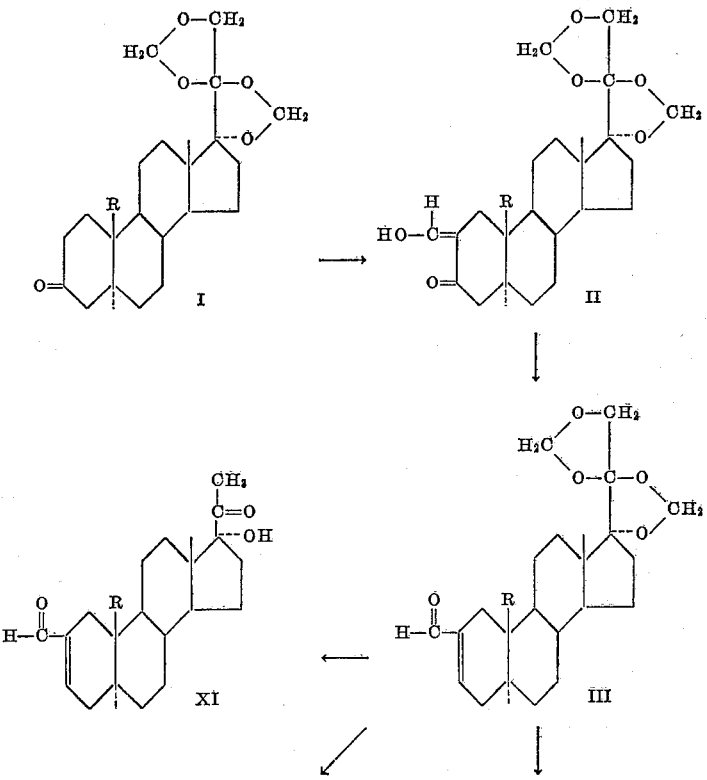

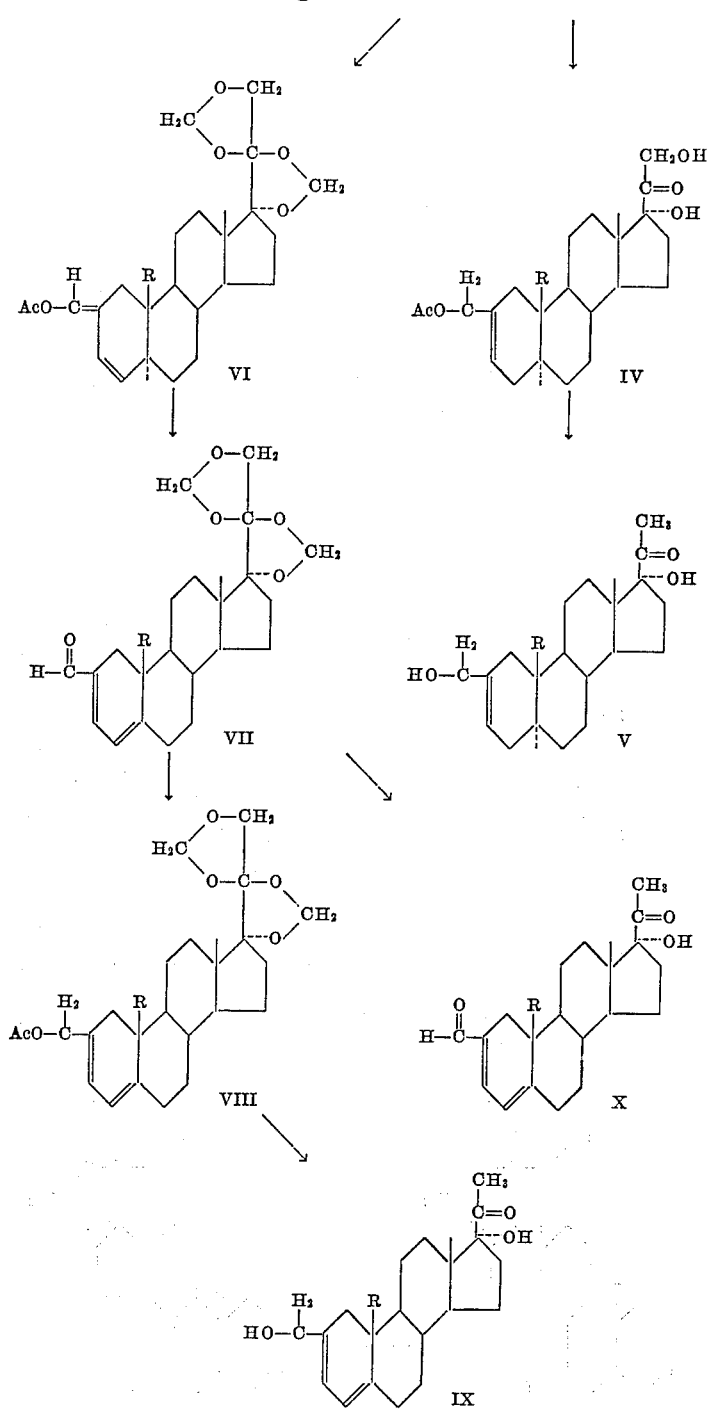

In the above formulas R has the same meaning as above set forth and Ac represents the acyl radical derived from a hydrocarbon carboxylic acid of the type mentioned previously and is preferably acetyl.

In practicing the process outlined above the starting compound or the 19-nor derivative (I) is prepared by treating Reichstein's compound S or the 19-nor derivative with formaldehyde in the presence of an acid, preferably hydrochloric acid to give the corresponding 17,20;20,21-bismethylenedioxy - Δ² - pregnen-3-one derivative which upon hydrogenation with, for example, lithium in liquid ammonia affords the corresponding 17,20;20,21-bismethylenedioxy-Δ⁴-pregnen-3-one derivative which upon hydrogenation with, for example, lithium in liquid ammonia affords the corresponding 17,20;20,21-bismethylenedioxy - allopregnan - 3 - one derivative (I). This compound is treated with ethyl formate in the presence of an alkali metal hydride such as sodium hydride and in a solvent inert to both of these reagents such as benzene. The sodium salt thus obtained is hydrolyzed with an acid, preferably aqueous hydrochloric acid, affording the respective 2-hydroxymethylene-17,20;20,21-bismethylenedioxy-allopregnan-3-one derivative (II). The 2-hydroxymethylene group is methylated with a suitable reagent, such as diazomethane, thus giving the corresponding 2-methoxymethylene-17,20;20,21-bismethylenedioxy-allopregnan-3-one derivative which upon reduction of the 3-keto group, preferably with sodium borohydride, and hydrolysis of the resulting 3β-hydroxy compound in a very mild acid medium yields the corresponding 2-formyl-17,20;20,21-bismethylenedioxy-Δ²-allopregnene derivative (III).

Upon reduction of the formyl group of the latter compound with a double metal hydride, such as sodium borohydride, there is afforded the respective 2-hydroxymethyl-17,20;20,21-bismethylenedioxy - Δ² - allopregnene derivatire which upon conventional acetylation yields the corresponding 2-acetoxymethyl derivative. Upon treatment of the latter compound with an acid such as 80% acetic acid, at approximately 100° C. for a period of time of the order of 7 hours, there is removed the protective bismethylenedioxy moiety to regenerate the dihydroxyacetone side chain at C–17 and thus form a 2-acetoxymethyl-$\Delta^2$-allopregnene-17$\alpha$,21-diol-20-one derivative (IV). To form the 21-desoxy derivative, the latter compound is treated with tosyl chloride in a solvent such as pyridine to form the 21-tosylate which upon subsequent reaction with sodium iodide in a suitable medium such as acetic acid results in the formation of the corresponding 2-acetoxymethyl-$\Delta^2$-allopregnen-17$\alpha$-ol-20-one. Upon conventional saponification, the latter compound is converted into the 2-hydroxymethyl-$\Delta^2$-allopregnen-17$\alpha$-ol-20-one derivative (V).

Following a second reaction sequence, the 2-formyl-17,20;20,21 - bismethylenedioxy-$\Delta^2$-allopregnene compound (III) or the 19-nor derivative is treated with a large excess of a hydrocarbon carboxylic acid anhydride such as acetic anhydride and a large excess of the corresponding acyl chloride such as acetyl chloride, affording the corresponding 2-acyloxymethylene-17,20;20,21-bismethylenedioxy-$\Delta^3$-allopregnene compound (VI). Upon treatment of this compound with N-bromsuccinimide in a suitable solvent such as dioxane in the presence of a mild acid, preferably perchloric acid, there is formed the corresponding 2-formyl-4$\beta$-bromo - 17,20;20,21 - bismethylenedioxy-$\Delta^2$-allopregnene compound which upon dehydrobromination with, for example, calcium carbonate and dimethylformamide affords the respective 2-formyl-17,20;20,21-bismethylenedioxy-$\Delta^{2,4}$-pregnadiene derivative (VII). Upon reduction of this compound, preferably with sodium borohydride, there is afforded the corresponding 2-hydroxymethyl-17,20;20,21-bismethylenedioxy - $\Delta^{2,4}$-pregnadiene derivative which upon conventional acetylation in pyridine furnishes the respective 2-acetoxymethyl derivative (VIII).

Removal of the bismethylenedioxy grouping from the 2-formyl-17,20;20,21-bismethylenedioxy - $\Delta^{2,4}$ - pregnadiene (VII) and from the 2-acetoxymethyl-17,20;20,21-bismethylenedioxy-$\Delta^{2,4}$-pregnadiene (VIII) in the manner described previously, affords the corresponding 2-formyl and 2-acetoxymethyl - $\Delta^{2,4}$ - pregnadiene-17$\alpha$,21-diol-20-one derivatives. Upon further treatment of these latter compounds with tosyl chloride, followed by reaction with sodium iodide and acetic acid, there is finally afforded the corresponding 21-desoxy compounds, 2-formyl-$\Delta^{2,4}$-pregnadien-17$\alpha$-ol-20-one (X), 2-acetoxymethyl - $\Delta^{2,4}$ - pregnadien-17$\alpha$-ol-20-one and the 19-nor derivatives thereof. Upon conventional saponification, the latter 2-acetoxymethyl compounds are converted into the corresponding 2 - hydroxymethyl - $\Delta^{2,4}$ - pregnadien - 17$\alpha$-ol-20-one derivatives (IX).

In a similar manner, 2-formyl-$\Delta^2$-allopregnene-17$\alpha$-ol-20-one (XI) and the 19-nor derivative are produced from the corresponding 2-formyl-$\Delta^2$-allopregnene-17$\alpha$,21-diol-20-one obtained by removal of the bismethylenedioxy moiety from the respective 2-formyl-17,20;20,21-bismethylenedioxy-allopregnene derivative (III).

The novel 2-methyl compounds of the present invention are prepared by the process illustrated by the following equation.

In the following formulas R has the same meaning as heretofore set forth.

In practicing the above outlined process, the above described 2-hydroxymethylene 17,20;20,21-bismethylenedioxy-allopregnan-3-one or the 19-nor derivative (II) is hydrogenated in the presence of a catalyst, such as 10%

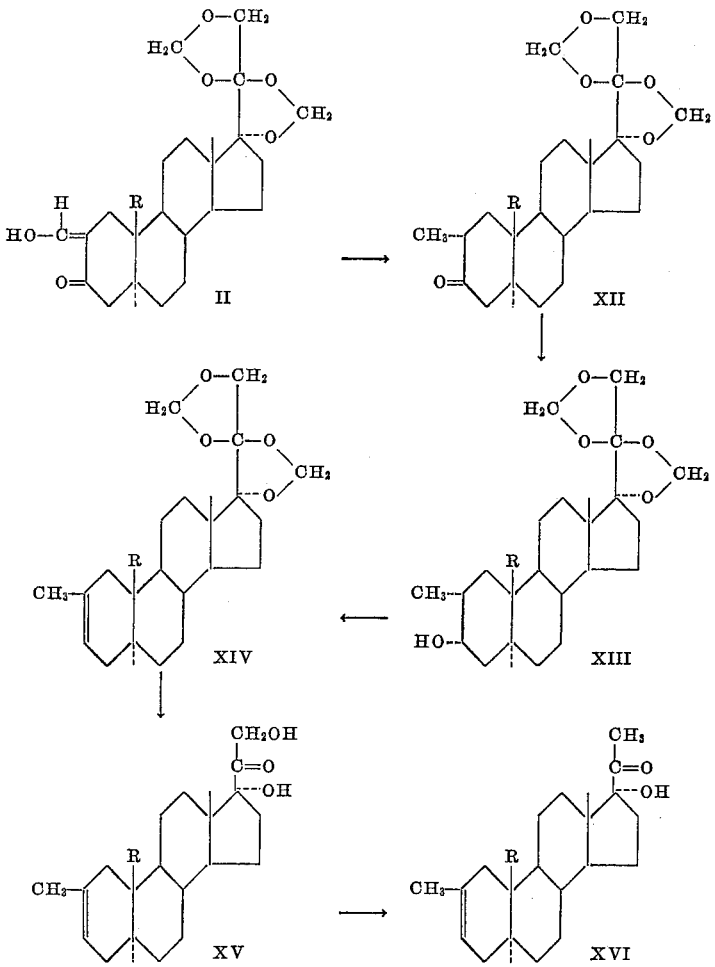

palladium on charcoal, in a suitable solvent such as methanol thus furnishing the corresponding 2α-methyl-17,20;20,21-bismethylenedioxy-allopregnan - 3 - one derivative (XII). This compound is reduced preferably with sodium borohydride to give the respective 2α-methyl-17,20;20,21-bismethylenedioxy-allopregnan-3β-ol derivative (XIII). Treatment of this compound with tosyl chloride in pyridine and subsequent reaction of the 3-tosylate obtained with collidine at reflux temperature, for a period of time of the order of 90 minutes affords the corresponding 2-methyl-17,20;20,21-bismethylenedioxy - Δ² - allopregnene-derivative (XIV). When treating this compound with an acid such as 80% acetic acid the 17,20;20,21-bismethylenedioxy group is hydrolyzed to give the corresponding 2-methyl-Δ²-allopregnene-17α,21 - diol - 20 - one derivative (XV). Treatment of this compound with tosyl chloride in pyridine and subsequent reaction of the 21-tosylate obtained with sodium iodide in a suitable solvent such as acetic acid, furnishes the respective 2-methyl-Δ²-allopregnene-17α-ol-20-one (XVI).

The preparation of the novel saturated compounds of the present invention which contain the formyl or hydroxymethyl group at C–2 are illustrated by the following equation:

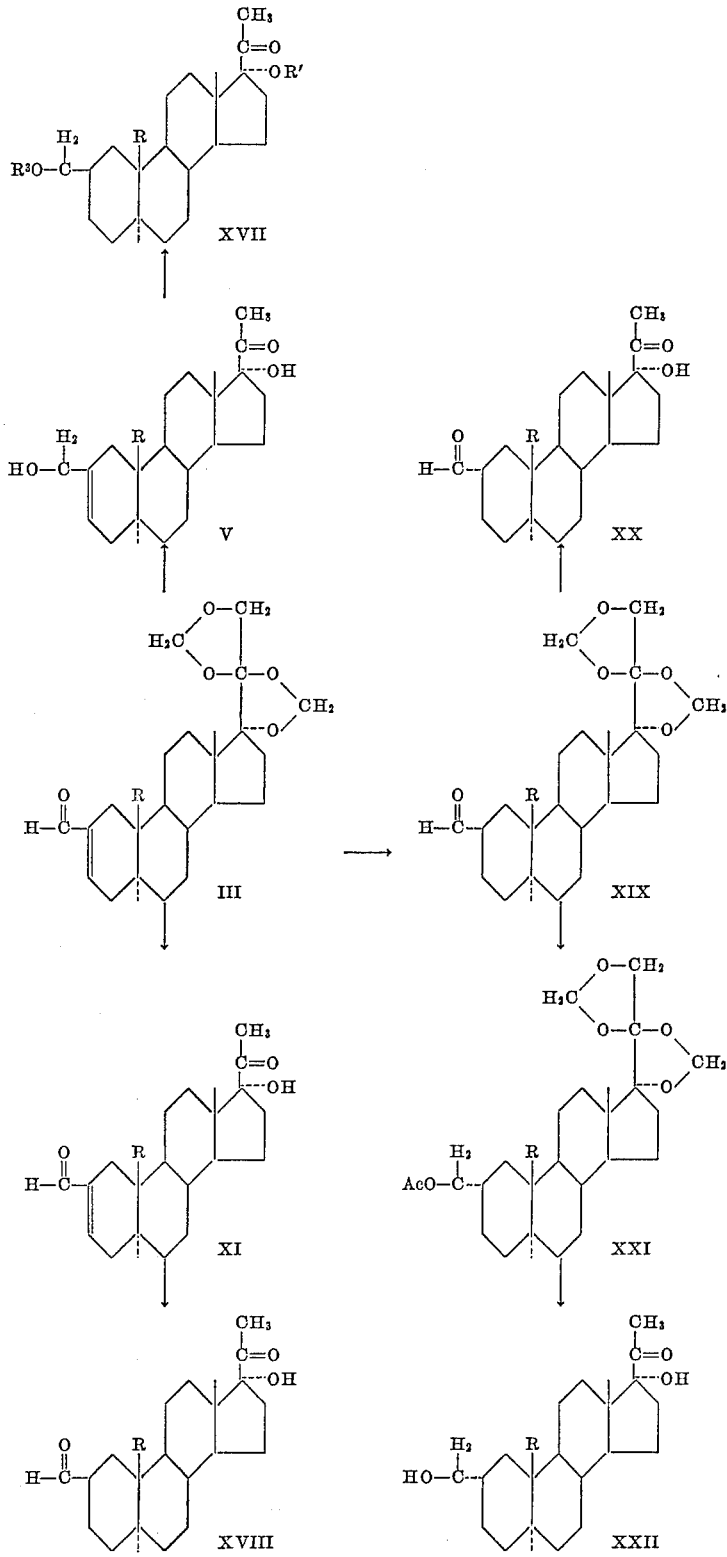

In the above formulas R, R¹, R³ and Ac have the same meaning as previously described.

In practicing the process above outlined, the hereinbefore obtained 2-formyl-17,20;20,21-bismethylenedioxy-Δ²-allopregnene or the 19-nor derivative thereof (III) is treated with an alkali metal such as lithium in liquid ammonia affording the corresponding 2α-formyl-17,20;20,21-bismethylenedioxy-allopregnane derivative (XIX). Reduction of this compound and conventional acetylation of the 2α-hydroxymethyl derivative obtained, yields the corresponding 2α-acetoxy-methyl-17,20;20,21-bismethylenedioxy-allopregnane derivative (XXI). The above obtained 2α-formyl and 2α-acetoxymethyl-17,20;20,21-bismethylenedioxyallopregnane derivatives (XIX) and (XXI) upon hydrolysis of the 17,20;20,21-bismethylenedioxy group and subsequent treatment with tosyl chloride and sodium iodide in order to eliminate the 21-hydroxyl group of the intermediate compounds thus formed, there is afforded correspondingly the 2α-formyl-allopregnane-17α-ol-20-one compound (XX) and the respective 2α-acetoxymethyl-allopregnane-17α-ol-20-one derivative. The latter compound on conventional saponification of the acetoxy group affords the corresponding 2α-hydroxymethyl derivative (XXII).

The hereinabove obtained 2-formyl-Δ²-allopregnene-17α-ol-20-one derivative (XI) on hydrogenation in the presence of a suitable catalyst such as platinum oxide in a solvent, preferably ethyl acetate, gives the corresponding 2β - formyl - allopregnan - 17α-ol-20-one compound (XVIII).

The heretofore obtained 2, 2β, and 2α-formyl derivatives are oxidized to the corresponding 2, 2β and 2α-carboxy compounds by treatment with a suitable agent, as for example chromium trioxide in pyridine.

The hereinabove described 2-hydroxymethyl-Δ²-allopregnene compounds (V) or their 2-acyloxymethyl derivatives are converted into the corresponding 2β-hydroxymethyl-allopregnane compound or the 2β-acyloxymethyl derivative (XVII) by hydrogenation in the presence of a catalyst, preferably platinum oxide and in an organic solvent such as ethylacetate.

The hydroxymethyl derivatives of the present invention are conventionally acylated in pyridine with an acylating agent, as for example an anhydride of a hydrocarbon carboxylic acid of the type described hereinabove, to give the corresponding acyloxymethyl derivatives.

The above obtained compounds with a 17α-hydroxyl group are conventionally acylated with an excess of acylating agent in the presence of a p-toluenesulfonic acid thus furnishing the corresponding 17α-acyloxy compound. When there is also present in the molecule a formyl group, subsequent treatment of the 17α-acyloxy compound in a mild basic medium such as a dilute potassium hydroxide solution, prevents the presence of an enol ester of the formyl in the final compound.

The following specific examples serve to illustrate but are not intended to limit the scope of the present invention:

Example I

A solution of 5 g. of Reichstein's compound S, in 40 cc. of 37% aqueous formaldehyde was treated with 0.5 cc. of concentrated hydrochloric acid and the mixture stirred for 48 hours at room temperature. It was then poured into water, the formed precipitate filtered off, washed with water to neutral and dried under vacuum thus affording 17,20;20,21 - bismethylenedioxy - Δ⁴-pregnen-3-one.

When applying the same method to the 19-nor Reichstein's compound S (Djerassi et al., U.S. Patent 2,753,342) there was obtained 17,20;20,21-bismethylenedioxy-19-nor Δ⁴-pregnen-3-one.

Example II

A solution of 4 g. of 17,20;21-bismethylenedioxy-Δ⁴-pregnen-3-one in 80 cc. of dioxane-ether (1:1) was added in a steady stream to a solution of 0.4 g. of lithium in 400 cc. of anhydrous liquid ammonia with good stirring. At the end of the addition the blue color was discharged by the addition of 20 g. of ammonium chloride and the ammonia was allowed to evaporate. The product was extracted with ether, washed with water, dried and the ether evaporated to afford a gum which was adsorbed from 100 cc. of benzene onto 150 g. of alumina. Elution with benzene ether afforded a product which upon recrystallization from acetone-hexane gave 17,20;20,21-bismethylenedioxy-allopregnan-3-one with a melting point of 234–236°, $[\alpha]_D$—67°.

Treatment of 17,20;20,21-bismethylenedioxy-19-nor-Δ⁴-pregnen-3-one by the same procedure afforded 17,20;20,21-bismethylenedioxy-19-nor-allopregnan-3-one.

Example III

To a solution of 3 g. of 17,20;20,21-bismethylenedioxy-allopregnan-3-one in 60 cc. of anhydrous benzene was added 3 cc. of ethyl formate and 1.3 g. of sodium hydride, suspended in mineral oil while cooling and stirring under an atmosphere of nitrogen. The mixture was stirred for 24 hours at room temperature, hexane was added until complete precipitation, the solid was collected and dried under vacuum. The crude material was suspended in aqueous hydrochloric acid and was stirred at room temperature for half hour. The precipitate was collected, washed with water and dried. Recrystallization from methylene chloride-hexane gave 2-hydroxymethylene-17,20;20,21-bismethylenedioxy-allopregnan-3-one, M.P. 228–229°, $[\alpha]_D$—48°, λ max. 282–4 mμ; log ε 3.97.

Following the same procedure there was treated 17,20;20,21-bismethylenedioxy-19-nor-allopregnan - 3 - one, furnishing 2-hydroxymethylene-17,20; 20,21-bismethylenedioxy-19-nor-allopregnan-3-one.

Example IV

To a solution of 3 g. of 2-hydroxymethylene-17,20;20,21-bismethylenedioxy-allopregnan-3-one in 60 cc. of methylene chloride were added an excess of diazomethane in ether (obtained from nitrosomethylurea) and a few drops of methanol. The reaction mixture was kept at room temperature for 18 hours. The excess reagent was decomposed with acetic acid. The resulting mixture was poured into water, the organic layer washed to neutral and evaporated to dryness. Recrystallization from acetone-hexane afforded 2-methoxymethylene-17,20;20,21-bismethylendioxy-allopregnan-3-one.

Treating by the same procedure 2-hydroxymethylene-17,20;20,21 - bismethylenedioxy - 19 - nor-allopregnan-3-one, there was obtained 2-methoxymethylene-17,20;20,21-bismethylenedioxy-19-nor-allopregnan-3-one.

Example V

A solution of 2 g. of sodium borohydride in 30 cc. of methanol was added with stirring to a solution of 2 g. of 2 - methoxymethylene - 17,20;20,21-bismethylenedioxy-allopregnan-3-one in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave 2-methoxymethylene-17,20;20,21-bismethylenedioxy-allopregnan-3β-ol.

Upon treatment by the same procedure of 2-methoxymethylene - 17,20;20,21 - bismethylenedioxy-19-nor-allopregnan-3-one there was obtained 2-methoxymethylene-17,20;20,21 - bismethylenedioxy - 19 - nor - allopregnan-3β-ol.

Example VI 1.5 g. of 2-methoxymethylene-17,20;20,21-bismethylenedioxy-allopregnan-3β-ol in 30 cc. of warm methanol were treated with 0.02 cc. of concentrated hydrochloric acid and the resulting mixture was allowed to stand for 3 minutes. Then it was poured into a large excess of water, the formed precipitate filtered off, washed and recrystallized from acetone thus affording 2-formyl-17,20; 20,21 - bismethylenedioxy-$\Delta^2$-allopregnene, M.P. 240-2°; $[\alpha]_D$ —16°; $\lambda$ max. 232 m$\mu$, log $\epsilon$ 4.14. When applying this method to 2 - methoxymethylene - 17,20;20,21 - bismethylenedioxy-19-nor-allopregnan-3$\beta$-ol, there was obtained 2-formyl - 17,20;20,21-bismethylenedioxy-19-nor-$\Delta^2$-allopregnene.

*Example VII*

1 g. of 2-formyl-17,20;20,21-bismethylenedioxy-$\Delta^2$-allopregnene was heated on a steam bath with 100 cc. of 80% acetic acid under nitrogen for 7 hours, it was then concentrated under vacuum to a small volume and poured into water. The precipitate was collected, washed well with water, dried and recrystallized from acetone-hexane, thus furnishing 2-formyl-$\Delta$-²-allopregnene-17$a$, 21-diol-20-one, M.P. 237-9°, $[\alpha]_D$+94°, $\lambda$ max. 232, log $\epsilon$ 4.14.

By the same technique was treated 2-formyl-17,20; 20,21-bismethylenedioxy-19-nor-$\Delta^2$-allopregnene thus furnishing 2 - formyl-19-nor-$\Delta^2$-allopregnene-17$\alpha$,21-diol-20-one.

*Example VIII*

A solution of 1.5 g. of 2-formyl-$\Delta^2$-allopregnene-17$\alpha$, 21-diol-20-one in 15 cc. of pyridine was cooled to 0° C. Under stirring there was added 0.5 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 2-formyl-$\Delta^2$-allopregnene-17$\alpha$,21-diol-20-one-21-tosylate.

A solution of 1 g. of the above crude compound in 50 cc. of glacial acetic acid was treated with 3 g. of sodium iodide and the mixture was refluxed for 2 hours, poured into ice water and extracted several times with methylene chloride; the extracts were combined, washed successively with aqueous sodium carbonate solution, sodium sulfite solution and water and then evaporated. By crystallization of the residue from acetone-hexane there was obtained 2-formyl-$\Delta^2$ - allopregnene - 17$\alpha$-ol-20-one, M.P. 224-4°; $[\alpha]_D$+86°, $\lambda$ max. 232 m$\mu$, log $\epsilon$ 4.12.

Upon treatment by the above technique of 2-formyl-19-nor-$\Delta^2$-allopregnene-17$\alpha$,21-diol-20 one, there was obtained 2-formyl-19-nor-$\Delta^2$-allopregnene-17$\alpha$-ol-20-one.

*Example IX*

2 - formyl- 17,20;20,21-bismethylenedioxy-$\Delta^2$-allopregnene and 2 - formyl - 17,20;20,21-bismethylenedioxy-19-nor-$\Delta^2$-allopregnene were treated following the technique described in Example V thus furnishing respectively 2-hydroxymethyl - 17,20;20,21 - bismethylenedioxy-$\Delta^2$-allopregnene, and 2 - hydroxymethyl-17,20;20,21-bismethylenedioxy-19-nor-$\Delta^2$-allopregnene.

*Example X*

A mixture of 1 g. of 2-hydroxymethyl-17,20;20,21-bismethylenedioxy-$\Delta^2$-allopregnene, 4 cc. of pyridine and 2 cc. of acetic anhydride was kept at room temperature overnight, poured into ice water, the formed precipitate was filtered, washed with water and dried. Crystallization from acetone-hexane gave 2-acetoxymethyl-17,20; 20,21 - bismethylenedioxy - $\Delta^2$-allopregnene. When acetylating by this technique 2-hydroxmethyl-17,20;20,21-bismethylenedioxy-19-nor-$\Delta^2$-allopregnene there was obtained 2 - acetoxymethyl- 17,20;20,21-bismethylenedioxy-19-nor-$\Delta^2$-allopregnene.

*Example XI*

2-acetoxymethyl-17,20; 20,21-bismethylenedioxy-$\Delta^2$-allopregnene and 2-acetoxymethyl-17,20; 20,21-bismethylenedioxy-19-nor-$\Delta^2$-allopregnene were treated following the technique of Example VII, thus furnishing respectively 2-acetoxymethyl-$\Delta^2$-allopregnene-17$\alpha$,21-diol-20 - one, and 2-acetoxymethyl-19-nor-$\Delta^2$-allopregnene-17$\alpha$,21-diol-20-one.

*Example XII*

These two last named compounds were treated following exactly the procedure described in Example VIII, thus affording correspondingly 2-acetoxymethyl-$\Delta^2$-allopregnene-17$\alpha$-ol-20-one and 2-acetoxymethyl-19-nor-$\Delta^2$-allopregnene-17$\alpha$-ol-20-one.

*Example XIII*

A solution of 1 g. of 2-acetoxymethyl-$\Delta^2$-allopregnene-17$\alpha$-ol-20-one in 50 cc. of methanol was refluxed for 3 hours with 500 mg. of potassium hydroxide dissolved in 1 cc. of water; it was then poured into ice water, the precipitate collected, washed with water to neutral and dried, thus producing a crude compound which upon recrystallization from methylene chloride-ether afforded 2-hydroxymethyl-$\Delta^2$-allopregnene-17$\alpha$-ol-20-one.

2-acetoxymethyl-19-nor-$\Delta^2$-allopregnene-17$\alpha$-ol-20-one was treated by the above technique furnishing 2-hydroxymethyl-19-nor-$\Delta^2$-allopregnene-17$\alpha$-ol-20-one.

*Example XIV*

A solution of 5 g. of 2-formyl-17,20; 20,21-bismethylenedioxy-$\Delta^2$-allopregnene obtained according to Example VI in 50 cc. of acetic anhydride and 50 cc. of acetyl chloride was boiled for 4 hours under an atmosphere of nitrogen. The reaction mixture then was distilled almost to dryness, cooled, diluted with ether and the organic extract washed with water, then with 5% sodium bicarbonate solution and finally with water. There was thus obtained 2-acetoxymethylene-17,20; 20,21-bismethylenedioxy-$\Delta^3$-allopregnene.

By the same technique there was treated 2-formyl-17,20; 20,21-bismethylenedioxy-19-nor-$\Delta^2$ - allopregnene, thus furnishing 2-acetoxymethylene-17,20; 20,21-bismethylenedioxy-19-nor-$\Delta^3$-allopregnene.

*Example XV*

A solution of 1 g. of 2-acetoxymethylene-17,20; 20,21-bismethylenedioxy-$\Delta^3$-allopregnene in 20 cc. of dioxane was treated with 1.5 cc. of a 0.5 N perchloric acid solution and then there were added over a period of 30 minutes 1.1 molar equivalents of N-chlorosuccinimide. The operation was conducted with constant stirring and at 5° C. The resulting mixture was further stirred for 2 hours. Water was added, the formed precipitate filtered off and dried. Crystallization from acetone-hexane afforded 2-formyl-4$\beta$-bromo-17,20; 20,21 - bismethylenedioxy-$\Delta^2$-allopregnene.

1 g. of the above compound was refluxed with 1 g. of calcium carbonate and 50 cc. of dimethylformamide for 30 minutes. The mixture filtered, the solvent evaporated under reduced pressure and the residue crystallized from acetone-hexane to afford 2-formyl-17,20; 20,21-bismethylenedioxy-$\Delta^{2,4}$-pregnadiene. Treatment of 2 - acetoxymethylene-17,20; 20,21 - bismethylenedioxy - 19-nor-$\Delta^3$-pregnene afforded 2-formyl-17,20; 20,21-bismethylenedioxy-19-nor-$\Delta^{2,4}$-pregnadiene.

*Example XVI*

2-formyl-17,20; 20,21-bismethylenedioxy-$\Delta^{2,4}$-pregnadiene and 2-formyl-17,20; 20,21-bismethylenedioxy-19-nor-$\Delta^{2,4}$-pregnadiene were treated following the procedure described in Example VII, thus furnishing correspondingly 2-formyl-$\Delta^{2,4}$-pregnadiene-17$\alpha$-21-diol-20-one and 2-formyl-19-nor-$\Delta^{2,4}$-pregnadiene-17$\alpha$-21-diol-20-one.

*Example XVII*

The two last named compounds were treated in accordance with Example VIII, thus affording respectively 2-formyl-$\Delta^{2,4}$-pregnadiene-17$\alpha$-ol-20-one and 2-formyl-19-nor-$\Delta^{2,4}$-pregnadiene-17$\alpha$-ol-20-one.

*Example XVIII*

2-formyl-17,20; 20,21-bismethylenedioxy-$\Delta^{2,4}$-pregnadiene and 2-formyl-17,20; 20,21-bismethylenedioxy-19-nor- $\Delta^{2,4}$-pregnadiene were reduced following exactly the technique described in Example V, giving correspondingly 2-hydroxymethyl-17,20; 20,21-bismethylenedioxy-$\Delta^{2,4}$-pregnadiene and 2-hydroxymethyl-17,20; 20,21-bismethylenedioxy-19-nor-$\Delta^{2,4}$-pregnadiene.

*Example XIX*

The two last named compounds were acetylated in accordance with Example X, thus furnishing respectively 2 - acetoxymethyl - 17,20; 20,21 - bismethylenedioxy-$\Delta^{2,4}$-pregnadiene and 2-acetoxymethyl-17,20; 20,21-bismethylenedioxy-19-nor-$\Delta^{2,4}$-pregnadiene.

*Example XX*

Treatment of these two compounds by the technique described in Example VII afforded respectively 2-acetoxymethyl-$\Delta^{2,4}$-pregnadiene-17$\alpha$,21-diol - 20 - one and 2-acetoxymethyl-19-nor-$\Delta^{2,4}$-pregnadiene-17$\alpha$,21-diol-20-one.

*Example XXI*

Upon treatment of the two foregoing compounds following the technique described in Example VIII, there were correspondingly obtained 2-acetoxymethyl-$\Delta^{2,4}$-pregnadiene-17$\alpha$-ol-20-one and 2-acetoxymethyl-19-nor-$\Delta^{2,4}$-pregnadiene-17$\alpha$-ol-20-one.

*Example XXII*

Saponification of these two compounds by the method described in Example XIII, afforded respectively 2-hydroxymethyl-$\Delta^{2,4}$-pregnadiene-17$\alpha$-ol - 20 - one and 2-hydroxymethyl-19-nor-$\Delta^{2,4}$-pregnadiene-17$\alpha$-ol-20-one.

*Example XXIII*

7 g. of 2-hydroxymethylene-17,20; 20,21-bismethylenedioxy-allopregnan-3-one obtained in accordance with Example III were dissolved in 300 cc. of methanol and mixed with 2.5 g. of a 10% palladium on charcoal catalyst. The mixture was hydrogenated at atmospheric pressure, at approximately 25° C. until the absorption of hydrogen ceased. The catalyst was removed by filtration, 1 g. of potassium hydroxide in 5 cc. of water was added to the solution which was then kept for one hour at room temperature. 2 cc. of acetic acid were added, the solvent was completely removed under reduced pressure, water was added to the residue and the product was extracted with methylene chloride. The extract was washed with water, dried over anhydrous sodium sulfate and evaporated to dryness under vacuum. Recrystallization from acetone-hexane afforded 2$\alpha$-methyl-17,20; 20,21-bismethylenedioxy-allopregnan-3 - one. Upon treatment by the same technique of 2-hydroxymethylene-17,20; 20,21-bismethylenedioxy-19-nor-allopregnan-3-one, there was obtained 2$\alpha$-methyl-17,20; 20,21-bismethylenedioxy-19-nor-allopregnan-3-one.

*Example XXIV*

2$\alpha$-methyl-17,20; 20,21-bismethylenedioxy-allopregnan-3-one and 2$\alpha$-methyl-17,20; 20,21-bismethylenedioxy-19-nor-allopregnan-3-one were reduced following the technique of Example V, thus affording respectively 2$\alpha$-methyl-17,20; 20,21-bismethylenedioxy-allopregnan-3$\beta$-ol and 2$\alpha$-methyl-17,20; 20,21-bismethylenedioxy-19-nor-allopregnan-3$\beta$-ol.

*Example XXV*

A solution of 5 g. of 2$\alpha$-methyl-17,20; 20,21-bismethylenedioxy-pregnan-3$\beta$-ol in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 2$\alpha$-methyl-17,20; 20,21 - bismethylenedioxy-allopregnan-3$\beta$-ol tosylate. The total crude compound was refluxed with 60 cc. of $\gamma$-collidine for 90 minutes under anhydrous conditions. The solution was cooled and filtered. The filtrate was diluted with ether, washed with dilute hydrochloric acid, sodium carbonate solution and water. The dried extract was evaporated and the residue was chromatographed on neutral alumina. Crystallization of the solid fractions from acetone-hexane afforded 2-methyl-17,20; 20,21-bismethylenedioxy-$\Delta^2$-allopregnene.

When applying the above techniques to 2$\alpha$-methyl-17,20; 20,21-bismethylenedioxy-19-nor-allopregnan-3$\beta$-ol, there was obtained 2-methyl-17,20; 20,21-bismethylenedioxy-19-nor-$\Delta^2$-allopregnene.

*Example XXVI*

2-methyl-17,20; 20,21 - bismethylenedioxy-$\Delta^2$-allopregnene and 2-methyl-17,20; 20,21-bismethylenedioxy-19-nor-$\Delta^2$-allopregnene were treated by the method delineated in Example VII, affording respectively 2-methyl-$\Delta^2$-allopregnene-17$\alpha$,21-diol-20-one and 2-methyl-19-nor-$\Delta^2$-allopregnene-17$\alpha$,21-diol-20-one.

*Example XXVII*

The two foregoing compounds were treated following the technique described in Example VIII, thus affording respectively 2methyl-$\Delta^2$-allopregnene-17$\alpha$-ol-20-one and 2-methyl-19-nor-$\Delta^2$-allopregnene-17$\alpha$-ol-20-one.

*Example XXVIII*

A solution of 5 g. of 2-formyl-17,20; 20,21-bismethylenedioxy-$\Delta^2$-allopregnene obtained in accordance with Example VI in 120 cc. of dioxane-ether (1:1) was added in a steady stream to a solution of 0.5 g. of lithium in 500 cc. of anhydrous liquid ammonia with good stirring. At the end of the addition the blue color was discharged by the addition of 25 g. of ammonium chloride and the ammonia was allowed to evaporate. The product was extracted with ether, washed with water, dried and the ether evaporated to afford a gum which was absorbed from 200 cc. of benzene onto 250 g. of alumina. Elution with benzene-ether afforded a product which upon recrystallization from acetone-hexane gave 2$\alpha$-formyl-17,20; 20,21-bismethylenedioxy-allopregnane. Treatment of 2-formyl-17,20; 20,21-bismethylenedioxy - 19 - nor-$\Delta^2$-allopregnene by the same procedure afforded 2$\alpha$-formyl-17,20; 20,21-bismethylenedioxy-19-nor-allopregnane.

*Example XXIX*

2$\alpha$-formyl-17,20; 20,21-bismethylenedioxy-allopregnane and 2$\alpha$-formyl-17,20; 20,21-bismethylenedioxy-19-nor-allopregnane were treated following the technique described in Example VII, thus furnishing correspondingly 2$\alpha$-formyl-allopregnane-17$\alpha$,21-diol-20-one and 2$\alpha$-formyl-19-nor-allopregnane-17$\alpha$,21-diol-20-one.

*Example XXX*

The two foregoing compounds were treated in accordance with Example VIII, thus affording respectively 2$\alpha$-formyl-allopregnane-17$\alpha$-ol-20-one, and 2$\alpha$-formyl-19-nor-allopregnane-17$\alpha$-ol-20-one.

*Example XXXI*

2$\alpha$-formyl-17,20; 20,21-bismethylenedioxy-allopregnane and 2$\alpha$-formyl-17,20; 20,21-bismethylenedioxy-19-nor-allopregnane were reduced in accordance with Example V, thus correspondingly giving 2$\alpha$-hydroxymethyl-17,20; 20,21-bismethylenedioxy-allopregnane and 2$\alpha$-hydroxymethyl-17,20; 20,21 - bismethylenedioxy-19-nor-allopregnane.

*Example XXXII*

Acetylation of the two foregoing compounds by the method of Example X afforded 2$\alpha$-acetoxymethyl-17,20; 20,21-bismethylenedioxy-allopregnane, and 2$\alpha$-acetoxymethyl - 17,20; 20,21-bismethylenedioxy-19-nor-allopregnane.

*Example XXXIII*

These two last named compounds were treated following the technique of Example VII, furnishing respectively 2α-acetoxymethyl-allopregnane - 17α,21 - diol-20-one and 2α-acetoxymethyl-19-nor-allopregnane - 17α,21 - diol-20-one.

*Example XXXIV*

Treatment of these two compounds by the procedure of Example VIII afforded 2α-acetoxymethyl-allopregnan-17α-ol-20-one and 2α-acetoxymethyl-19-nor-allopregnan-17α-ol-20-one.

*Example XXXV*

Saponification of these compounds by the method of Example XIII afforded 2α-hydroxymethyl-allopregnan-17α-ol-20-one and 2α-hydroxymethyl-19-nor-allopregnan-17α-ol-20-one.

*Example XXXVI*

A solution of 2 g. of 2-formyl-Δ²-allopregnene-17α-ol-20-one obtained in accordance with Example VIII, in 100 cc. of ethyl acetate was shaken with 100 mg. of platinum oxide catalyst in a hydrogen atmosphere until the gas uptake corresponded to one mol. The catalyst was filtered off, the filtrate was washed with water, dried over anhydrous sodium sulfate and evaporated to dryness. Recrystallization from acetone-hexane afforded 2β-formyl-allopregnan-17α-ol-20-one.

Treatment of 2-formyl-19-nor-Δ²-allopregnene-17α-ol-20-one by the above procedure afforded 2β-formyl-19-nor-allopregnan-17α-ol-20-one.

*Example XXXVII*

1 g. of 2-hydroxymethyl-Δ²-allopregnene-17α-ol-20-one obtained according to Example XIII was treated following the technique described in Example X, but using propionic anhydride instead of acetic anhydride thus furnishing 2-propionoxymethyl-Δ²-allopregnene - 17α-ol-20-one.

Following the same method, there were treated the starting compounds listed below giving the corresponding products hereinafter set forth:

| Starting compound | Product |
|---|---|
| 2 - hydroxymethyl - 19 - nor - Δ² - allopregnene-17α-ol-20-one. | 2 - propionoxymethyl - 19 - nor - Δ² - allopregnene-17α-ol-20-one. |
| 2 - hydroxymethyl - 19 - nor - Δ²,⁴ - pregnadiene-17α-ol-20-one. | 2 - propionoxymethyl - 19 - nor - Δ²,⁴ - pregnadiene-17α-ol-20-one. |
| 2 - hydroxymethyl - Δ²,⁴ - pregnadiene-17α-ol-20-one. | 2 - propionoxymethyl - Δ²,⁴ - pregnadiene-17α-ol-20-one. |
| 2α-hydroxymethyl - allopregnane-17α-ol-20-one. | 2α - propionoxymethyl - allopregnane-17α-ol-20-one. |
| 2α - hydroxymethyl - 19 - nor - allopregnane-17α-ol-20-one. | 2α - propionoxymethyl - 19 - nor - allopregnane-17α-ol-20-one. |

Following exactly the same procedure but substituting propionic anhydride by caproic anhydride, cyclopentylpropionic anhydride and benzoyl chloride there were correspondingly obtained the caproxy, cyclopentylpropionoxy and benzoyloxy derivatives of the above starting compounds.

*Example XXXVIII*

A mixture of 1 g. of 2-formyl-Δ²-allopregnene-17α-ol-20-one, 1 g. of p-toluenesulfonic acid monohydrate, 50 cc. of acetic acid and 25 cc. of acetic anhydride was kept for 24 hours at room temperature. It was then poured into water and stirred until the excess of anhydride had hydrolized. The product was isolated by methylene chloride extraction, dissolved in 20 cc. of dioxane and treated with 10 cc. of cold 2% methanolic potassium hydroxide. The mixture was kept at 0–5° C. for one hour and then poured into water and neutralized with dilute hydrochloric acid. Ether extraction and crystallization from acetone-hexane afforded 2-formyl-Δ²-allopregnene-17α-ol-20-one-17 acetate.

Following the same technique there were treated the starting compounds listed below, with the indicated anhydride affording the corresponding products hereinafter set forth.

| Starting compound | Anhydride | Product |
|---|---|---|
| 2-formyl-Δ²-allopregnene-17α-ol-20-one. | Propionic | 17-propionate of 2-formyl-Δ²-allopregnene-17α-ol-20-one. |
| 2-formyl-19-nor-Δ²-allopregnene-17α-ol-20-one. | do | 17-propionate of 2-formyl-19-nor-Δ²-allopregnene-17α-ol-20-one. |
| 2-formyl-19-nor-Δ²-allopregnene-17α-ol-20-one. | Caproic | 17-caproate of 2-formyl-19-nor-Δ²-allopregnene-17α-ol-20-one. |
| 2-formyl-Δ²,⁴-pregnadiene-17α-ol-20-one. | Acetic | 17-acetate of 2-formyl-Δ²,⁴-pregnadiene-17α-ol-20-one. |
| 2-formyl-Δ²,⁴-pregnadiene-17α-ol-20-one. | Cyclopentylpropionic. | 17-cyclopentylpropionate of 2-formyl-Δ²,⁴-pregnadiene-17α-ol-20-one. |
| 2-formyl-19-nor-Δ²,⁴-pregnadiene-17α-ol-20-one. | Acetic | 17-acetate of 2-formyl-19-nor-Δ²,⁴-pregnadiene-17α-ol-20-one. |
| 2-formyl-19-nor-Δ²,⁴-pregnadiene-17α-ol-20-one. | Caproic | 17-caproate of 2-formyl-19-nor-Δ²,⁴-pregnadiene-17α-ol-20-one. |
| 2α-formyl-allopregnane-17α-ol-20-one. | Propionic | 17-propionate of 2α-formyl-allopregnane-17α-ol-20-one. |
| 2α-formyl-allopregnane-17α-ol-20-one. | Cyclopentylpropionic. | 17-cyclopentylpropionate of 2α-formyl-allopregnane-17α-ol-20-one. |
| 2α-formyl-19-nor-allopregnane-17α-ol-20-one. | Acetic | 17-acetate of 2α-formyl-19-nor-allopregnane-17α-ol-20-one. |
| 2α-formyl-19-nor-allopregnane-17α-ol-20-one. | Caproic | 17-caproate of 2α-formyl-19-nor-allopregnane-17α-ol-20-one. |

*Example XXXIX*

A mixture of 1 g. of 2-hydroxymethyl-Δ²-allopregnene-17α-ol-20-one, 1 g. of p-toluenesulfonic acid monohydrate, 50 cc. of acetic acid and 25 cc. of acetic anhydride was kept for 24 hours at room temperature. It was then poured into water and stirred until the excess of anhydride had hydrolized. Isolation of the product by methylene chloride extraction and crystallization of the residue from acetone-hexane afforded the 17-acetate of 2-acetoxymethyl-Δ²-allopregnene-17α-ol-20-one.

Following the above technique there were treated the starting compounds listed below with the indicated anhydride, thus giving the corresponding products hereinafter set forth.

| Starting compound | Anhydride | Product |
|---|---|---|
| 2-hydroxymethyl-19-nor-Δ²-allopregnene-17α-ol-20-one | Propionic | 2-propionoxymethyl-19-nor-Δ²-allopregnene-17α-ol-20-one-17-propionate |
| 2-hydroxymethyl-Δ²,⁴-pregnadiene-17α-ol-20-one | do | 2-propionoxymethyl-Δ²,⁴-pregnadiene-17α-ol-20-one-17-propionate |
| 2-hydroxymethyl-19-nor-Δ²,⁴-pregnadiene-17α-ol-20-one | Caproic | 2-caproxymethyl-19-nor-17α-ol-20-one-17-caproate |
| 2α-hydroxymethyl-allopregnane-17α-ol-20-one | do | 2α-caproxymethyl-allopregnane-17α-ol-20-one-17-caproate |
| 2α-hydroxymethyl-19-nor-allopregnane-17α-ol-20-one | Cyclopentylpropionic | 2α-cyclopentylpropionoxymethyl-19-nor-allopregnane-17α-ol-20-one-17-cyclopentylpropionate |
| 2-acetoxymethy-Δ²-allopregnene-17α-ol-20-one | Propionic | 17-propionate of 2-acetoxymethyl-Δ²-allopregnene-17α-ol-20-one |
| 2-propionoxymethyl-19-nor-Δ²-allopregnene-17α-ol-20-one | Acetic | 17-acetate of 2-propionoxymethyl-19-nor-Δ²-allopregnene-17α-ol-20-one |
| 2-acetoxymethyl-Δ²,⁴-pregnadiene-17α-ol-20-one | Caproic | 17-caproate of 2-acetoxymethyl-Δ²,⁴-pregnadiene-17α-ol-20-one |
| 2-caproxymethyl-19-nor-Δ²,⁴-pregnadiene-17α-ol-20-one | Propionic | 17-propionate of 2-caproxymethyl-19-nor-Δ²,⁴-pregnadiene-17α-ol-20-one |
| 2α-cyclopentylpropionoxymethyl-allopregnane-17α-ol-20-one | Acetic | 17-acetate of 2α-cyclopentylpropionoxymethyl-allopregnane-17α-ol-20-one |
| 2α-propionoxymethyl-19-nor-allopregnane-17α-ol-20-one | Cyclopentylpropionic | 17-cyclopentylpropionate of 2α-propionoxymethyl-19-nor-allopregnane-17α-ol-20-one |
| 2-methyl-Δ²-allopregnene-17α-ol-20-one | Acetic | 17-acetate of 2-methyl-Δ²-allopregnene-17α-ol-20-one |
| 2-methyl-Δ²-allopregnene-17α-ol-20-one | Propionic | 17-propionate of 2-methyl-Δ²-allopregnene-17α-ol-20-one |
| 2-methyl-19-nor-Δ²-allopregnene-17α-ol-20-one | Acetic | 17-acetate of 2-methyl-19-nor-Δ²-allopregnene-17α-ol-20-one |
| 2-methyl-19-nor-Δ²-allopregnene-17α-ol-20-one | Caproic | 17-caproate of 2-methyl-19-nor-Δ²-allopregnene-17α-ol-20-one |

Example XXXX

The starting compounds listed below were hydrogenated following the technique described in Example XXXVI, furnishing the corresponding products hereinafter set forth.

| Starting compound | Product |
|---|---|
| 2-hydroxymethyl-Δ²-allopregnene-17α-ol-20-one | 2β-hydroxymethyl-allopregnane-17α-ol-20-one |
| 2-hydroxymethyl-19-nor-Δ²-allopregnene-17α-ol-20-one | 2β-hydroxymethyl-19-nor-allopregnane-17α-ol-20-one |
| 2-acetoxymethyl-Δ²-allopregnene-17α-ol-20-one | 2β-acetoxymethyl-allopregnane-17α-ol-20-one |
| 2-propionoxymethyl-19-nor-Δ²-allopregnene-17α-ol-20-one | 2β-propionoxymethyl-19-nor-17α-ol-20-one |
| 2-propionoxymethyl-19-nor-Δ²-allopregnene-17α-ol-20-one-17-acetate | 2β-propionoxymethyl-19-nor-allopregnane-17α-ol-20-one-17-acetate |
| 2-acetoxymethyl-Δ²-allopregnene-17α-ol-20-one-17-propionate | 2β-acetoxymethyl-allopregnane-17α-ol-20-one-17-propionate |

We claim:
1. A compound of the following formula:

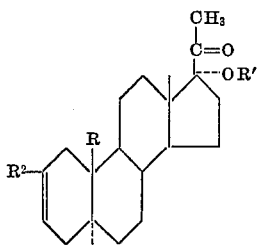

wherein R is selected from the group consisting of hydrogen and methyl; $R^1$ is selected from the group consisting of hydrogen and a hydrocarbon carboxylic acyl group of less than 12 carbon atoms; $R^2$ is selected from the group consisting of formyl (—CHO) and —CH$_2$—OR$^3$, wherein $R^3$ is a member of the group consisting of hydrogen and a hydrocarbon carboxylic acyl group of less than 12 carbon atoms.

2. 2-formyl-Δ²-allopregnene-17α-ol-20-one.
3. 2-formyl-19-nor-Δ²-allopregnene-17α-ol-20-one.
4. 2-hydroxymethyl-Δ²-allopregnene-17α-ol-20-one.
5. 2 - hydroxymethyl - 19 - nor - Δ² - allopregnene - 17α-ol-20-one.
6. 2-formyl-Δ²-allopregnene-17α-ol-20-one-17-acetate.
7. 2 - acetoxymethyl - Δ² - allopregnene - 17α - ol - 20-one-17-acetate.
8. A compound of the following formula:

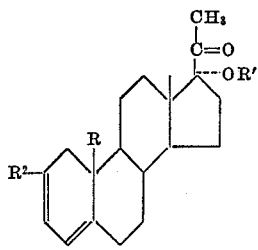

wherein R is selected from the group consisting of hydrogen and methyl; $R^1$ is selected from the group consisting of hydrogen and a hydrocarbon carboxylic acyl group of less than 12 carbon atoms; $R^2$ is selected from the group consisting of formyl (—CHO) and —CH$_2$—OR$^3$, wherein $R^3$ is a member of the group consisting of hydrogen and a hydrocarbon carboxylic acyl group of less than 12 carbon atoms.

9. 2-formyl-Δ²,⁴-pregnadiene-17α-ol-20-one.
10. 2-formyl-19-nor-Δ²,⁴-pregnadiene-17α-ol-20-one.
11. 2-hydroxymethyl-Δ²,⁴-pregnadiene-17α-ol-20-one.
12. 2 - hydroxymethyl - 19-nor-Δ²,⁴-pregnadiene-17α-ol-20-one.
13. 2-formyl-Δ²,⁴-pregnadiene-17α-ol-20-one-17-acetate.
14. 2 - propionoxymethyl - Δ²,⁴ - pregnadiene - 17α - ol-20-one-17-propionate.
15. A compound of the following formula:

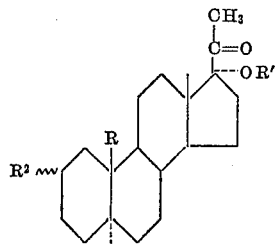

wherein R is selected from the group consisting of hydrogen and methyl; $R^1$ is selected from the group consisting of hydrogen and a hydrocarbon carboxylic acyl group of less than 12 carbon atoms; $R^2$ is selected from the group consisting of formyl (—CHO) and —CH$_2$—OR$^3$, wherein $R^3$ is a member of the group consisting of hydrogen and a hydrocarbon carboxylic acyl group of less than 12 carbon atoms.

16. 2α-formyl-allopregnane-17α-ol-20-one.
17. 2α-formyl-19-nor-allopregnane-17α-ol-20-one.
18. 2α-hydroxymethyl-allopregnane-17α-ol-20-one.
19. 2α - hydroxymethyl - 19 - nor - allopregnane - 17α-ol-20-one.
20. 2α - formyl - allopregnane - 17α - ol - 20 - one - 17-propionate.
21. 2α - caproxymethyl - allopregnane - 17α - ol - 20-one-17-caproate.
22. 2β-formyl-allopregnane-17α-ol-20-one.
23. 2β-formyl-19-nor-allopregnane-17α-ol-20-one.
24. 2β-hydroxymethyl-allopregnane-17α-ol-20-one.
25. 2β - hydroxymethyl - 19 - nor - allopregnane - 17α-ol-20-one.
26. 2β - acetoxymethyl - allopregnane - 17α - ol - 20-one-17-propionate.
27. A compound of the following formula:

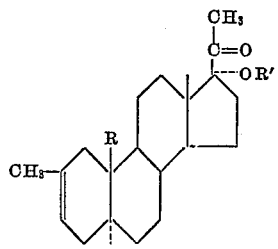

wherein R is selected from the group consisting of hydrogen and methyl; $R^1$ is selected from the group consisting of hydrogen and a hydrocarbon carboxylic acyl group of less than 12 carbon atoms.

28. 2-methyl-Δ²-allopregnene-17α-ol-20-one.
29. 2-methyl-19-nor-Δ²-allopregnene-17α-ol-20-one.
30. 2 - methyl - Δ² - allopregnene - 17α - ol - 20 - one-17-acetate.

No references cited.